United States Patent
Saito et al.

[11] Patent Number: 6,111,456
[45] Date of Patent: Aug. 29, 2000

[54] SEMICONDUCTOR CIRCUIT

[76] Inventors: Hidetoshi Saito, 101, Sunny-well, 185-1, Kami iida-cho, Izumi-ku; Shigeru Atsumi, 108-2-201, Ueno-cho 3-chome, Naka-fu; Akira Umezawa, 2-40-5-305, Higashi-kanagawa, Kanagawa-ku, all of Yokohama-shi, Kanagawa-ken, Japan

[21] Appl. No.: 09/030,722

[22] Filed: Feb. 25, 1998

[30] Foreign Application Priority Data

Feb. 26, 1997 [JP] Japan ................................ 9-042627

[51] Int. Cl.7 ................................ G01K 7/00; G05F 1/10
[52] U.S. Cl. ........................ 327/541; 327/530; 327/437; 327/537; 331/57
[58] Field of Search .................................... 327/100, 333, 327/306, 530, 542, 541, 437; 331/57; 323/315

[56] References Cited

U.S. PATENT DOCUMENTS

| | | | |
|---|---|---|---|
| 5,008,609 | 4/1991 | Fukiage | 327/537 |
| 5,388,084 | 2/1995 | Itoh et al. | 365/226 |
| 5,499,209 | 3/1996 | Oowaki et al. | 365/189.1 |
| 5,544,120 | 8/1996 | Kuwagata et al. | 365/222 |
| 5,668,487 | 9/1997 | Chonan | 327/534 |
| 5,717,935 | 2/1998 | Zanders et al. | 323/354 |

*Primary Examiner*—Dinh T. Le
*Attorney, Agent, or Firm*—Hogan & Hartson LLP

[57] ABSTRACT

A semiconductor circuit comprises an I-type of NMOS transistors N15 and N16 connected between a power supply voltage VDD and a ground electrode. The gate electrode of the NMOS transistor N15 is set to a reference voltage VREF that is lower than the power supply voltage VDD. The drain voltage VD of the NMOS transistor N16 is almost equal to the reference voltage VREF, and the NMOS transistor N16 acts in a linear region. Accordingly, the NMOS transistor N16 acts in the same manner as the resistor element and has no influence on change of the concentration of the diffusion resistor or the power supply voltage VDD.

38 Claims, 9 Drawing Sheets

SEMICONDUCTOR CIRCUIT

BACKGROUND OF THE INVENTION

1. Field of the Invention

The present invention relates to a semiconductor circuit which is formed on a semiconductor substrate, and, for example, to an oscillating circuit which comprises a plurality of inverters connected in series.

2. Description of the Prior Art

It has been known that an oscillating circuit is constructed when a plurality of inverters which invert the input signal are connected in series. When these inverters are composed of MOS transistors, all elements composing the oscillator circuit can be formed on a semiconductor substrate.

Figure 11:
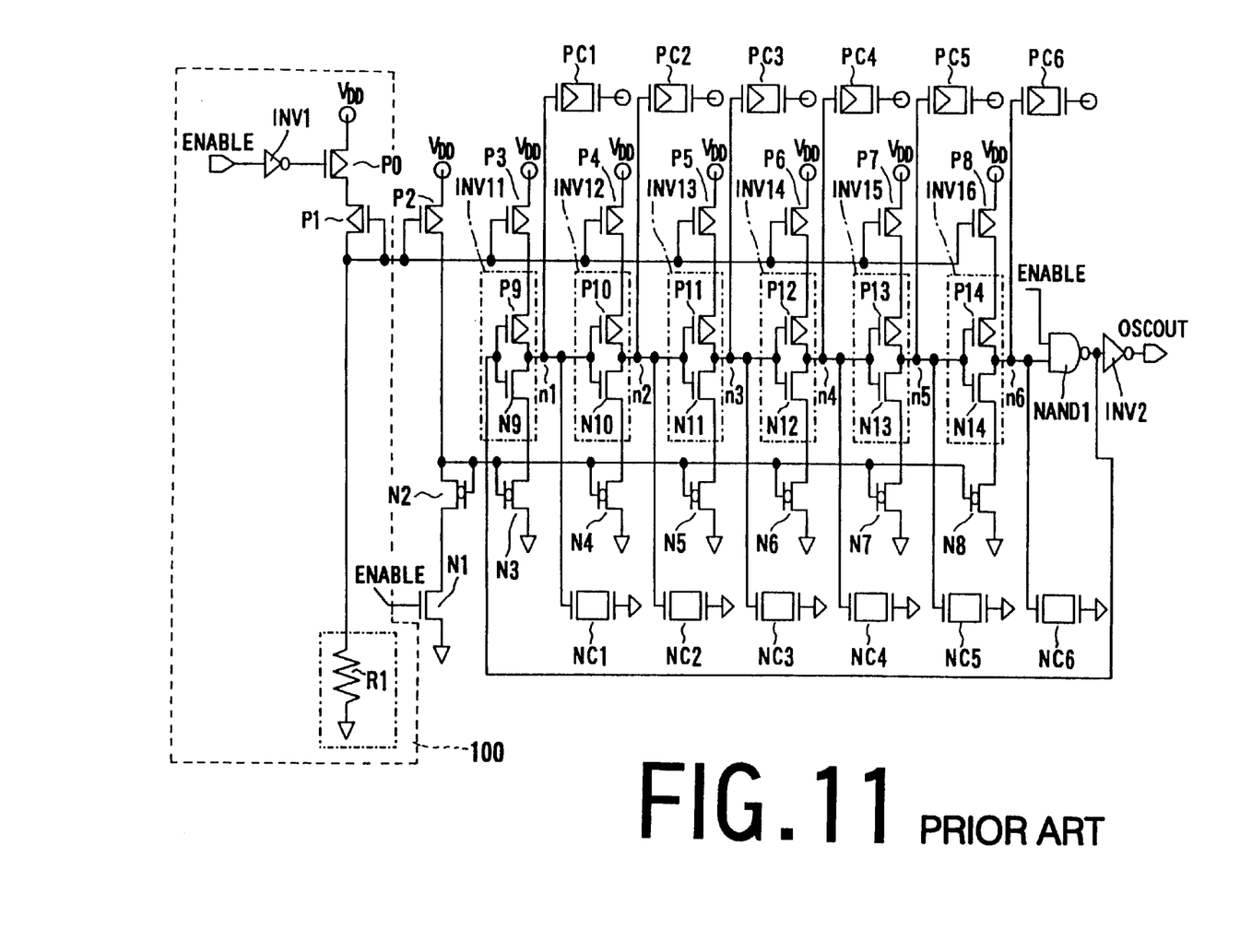
FIG. 11 is a circuit diagram showing an example of conventional oscillating circuits.

FIG. 11 is a circuit diagram showing an example of such a kind of oscillating circuit. The oscillating circuit, as shown by a dot-and-dash line in FIG. 11, comprises six inverters connected in series. The output of the last one of these inverters is fed back to the first one of those via NAND gate G1.

In FIG. 11, PMOS transistors P1–P8 and NMOS transistors N1–N8 act as limiters restricting the current which is supplied to the inverters INV11–INV16. A resistor R1 is connected to the PMOS transistor P1 in series. The current I flowing through the resistor R1 is detected by PMOS transistor P1. The gate electrodes of the PMOS transistors P1–P8 are connected to each other. Since the gate voltages of the transistors P1–P8 are the same, the current flowing through the PMOS transistors P2–P8 is limited by the current I flowing through the resistor R1.

NMOS transistor N2 is connected to the PMOS transistor P2 in series. Since the gate electrodes of NMOS transistors N2–N8 are connected to each other, the current flowing through the NMOS transistors N2–N8 is also limited by the current I flowing through the resistor R1.

Furthermore, when the size of the PMOS transistors P9–P14 composing the inverters INV11–INV16 is larger than that of the PMOS transistors P3–P8, and the size of the NMOS transistors N9–N14 is larger than that of the NMOS transistors N3–N8, the current flowing through nodes n1–n6 shown in FIG. 11 is also limited by the current I flowing through the resistor R1.

Each pair of capacitors PC1–PC6 constructed by PMOS transistors and the corresponding capacitors NC1–NC6 constructed by NMOS transistors is connected to the nodes n1–n6, respectively. These capacitors repeat the electric charge and discharge operation depending on the voltage level of the nodes n1–n6.

The electric charge amount of the nodes n1–n6 is determined by each capacitance C of the nodes n1–n6 and the power supply voltage VDD. The delay time T for signal transmission at each one of the inverters shown in FIG. 11 is given by equation (1).

$$T = C \ast VDD / I \qquad (1)$$

The current I flowing through the resistor R1 is determined by the voltage VDD and the resistance R of the resistor R1, and is given by equation (2).

$$I = VDD / R \qquad (2)$$

As a result, the delay time T for signal transmission at each one of the inverters is given by equation (3).

$$T = C \ast R \qquad (3)$$

From the equation (3), it can be seen that the delay time T is not dependent on the power supply voltage VDD, and is determined by the resistance R of the resistor R1 and each capacitance C of the nodes n1–n6.

Figure 12:
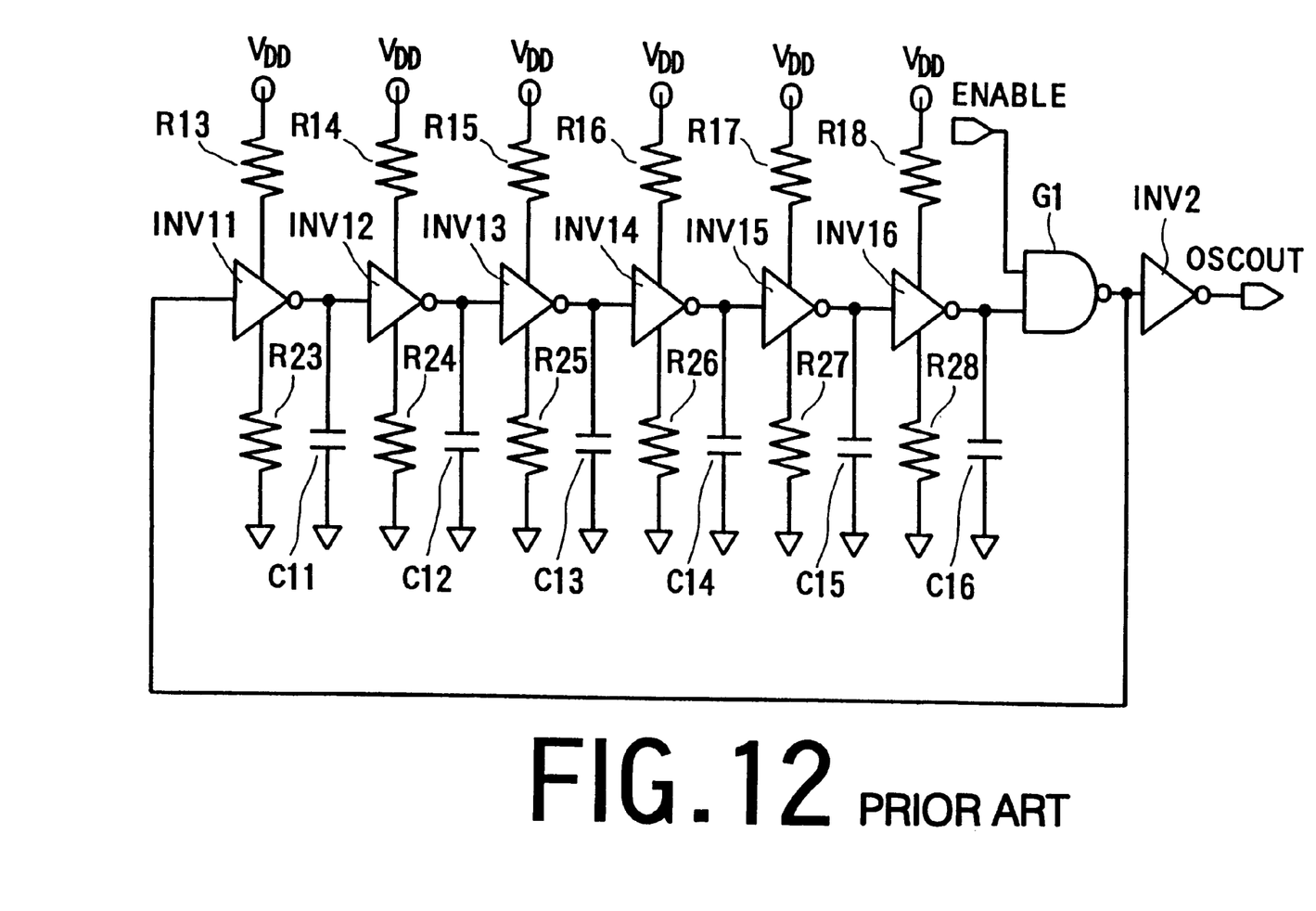
FIG. 12 is an equivalent circuit diagram of an oscillating circuit in FIG. 11.

FIG. 12 is an equivalent circuit diagram of the oscillating circuit in FIG. 11. In FIG. 12, the circuit is simplified by replacing the PMOS transistors P3–P8 by the resistors R13–R18, the NMOS transistors N3–N8 by the resistors R23–R28, and each pair of the capacitors PC1–PC6 and the corresponding capacitors NC1–NC6 connected to the nodes n1–n6 by the capacitors C11–C16, respectively.

The oscillation frequency of the circuit in FIG. 12 can be controlled by changing the capacitance of the capacitors C11–C16. Moreover, the frequency can also be controlled by utilizing the fact that the current flowing through the resistors R13–R18 and R23–R28 in FIG. 12 changes depending on change of the resistance of resistor R1, which is shown in FIG. 11 and omitted in FIG. 12.

As described above, the conventional oscillating circuit in FIG. 11 has the advantage that the circuit can set the oscillation frequency without being affected by change of the power supply voltage and can be formed easily on the semiconductor substrate, since the circuit is able to composed of a plurality of MOS transistors.

When the oscillating circuit in FIG. 11 is formed on the semiconductor substrate, the resistor R1 shown in FIG. 11 is usually formed by utilizing a diffusion resistor. However, if an improvement of the voltage-resistant property or the like is performed, the concentration of the diffusion layer may change in response thereto, and if the concentration of the diffusion layer changes, the resistance of the resistor R1 may change and as a result, it may be necessary to change the circuit configuration.

SUMMARY OF THE INVENTION

Accordingly, the object of the present invention is to provide a semiconductor circuit that can set an impedance without being affected by the concentration of the diffusion layer.

To achieve the above-mentioned object, the invention provides a semiconductor circuit composed of first and second transistors connected in series between first voltage electrodes having a first voltage and second voltage electrodes with a second voltage which is lower than said first voltage, wherein: said first transistor having a gate (base) voltage set to a reference voltage that is lower than said first voltage and higher than said second voltage so that a connecting point between said first and second transistors has a voltage independent from said first voltage; and said second transistor having a gate (base) electrode to which a prescribed voltage is applied so that said second transistor operates in a linear region in which the gate (base) voltage and a drain (collector) voltage change linearly, thus causing said second transistor to act as an impedance element.

Since the present invention connects first and second transistors in series, and maintains the second transistor in a linear region, said second transistor performs the same operation as the resistor element; accordingly, it is unnecessary to provide a resistor element separately. Therefore, the semiconductor circuit according to the present invention is not affected by the dispersion of the resistance due to change of a concentration in the diffusion layer, and as a result, the electrical properties becomes stable.

Further, since the present invention performs a control such that the voltage of the connecting point between the first and second transistors is not affected by change of the power supply voltage, the second transistor can be used as an impedance element wherein the changing amount of the impedance is very little.

Further, if the gate (base) voltage of the least one of the first and second transistors is changeable, it become possible to control the impedance of the second transistor, and to change programmably the oscillating frequency of the oscillating circuit composed of said first and second transistors.

DESCRIPTION OF THE PREFERRED EMBODIMENT

The present invention can be more fully understood by reference to the following description and accompanying drawing.

(First embodiment)

A first embodiment of the present invention has the same basic configuration as the oscillation circuit in FIG. 11 except replacing the resistor R1 in FIG. 11 by two NMOS transistors N15 and N16.

Figure 1:
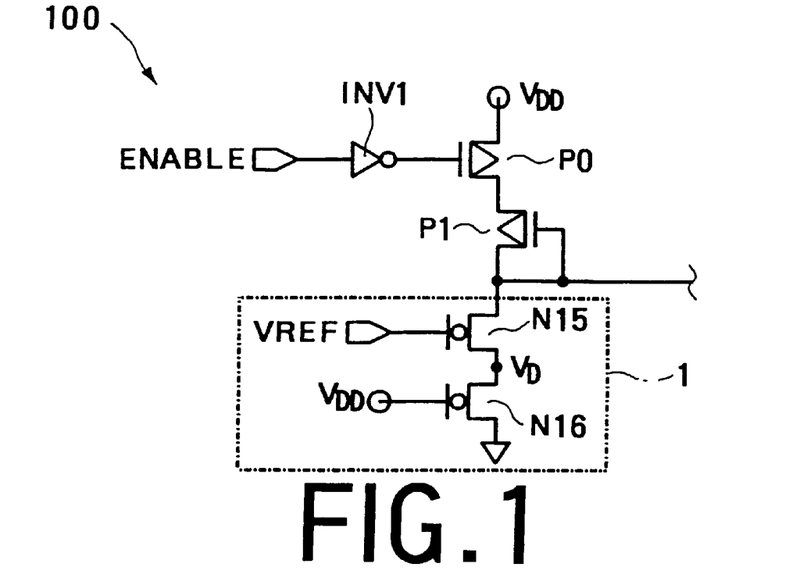
FIG. 1 is a circuit diagram showing the configuration of an oscillation circuit in a first embodiment of the invention.

FIG. 1 is a circuit diagram showing the configuration of an oscillation circuit in the first embodiment. FIG. 1 shows constituent elements that are different from the circuit in FIG. 11. To be concrete, FIG. 1 shows the configuration corresponding to the portion enclosed by the dotted line in FIG. 11.

A dot-and-dashed line in FIG. 1 shows an impedance element replacing of the resistor R1 in FIG. 11. The other configuration in FIG. 1 is the same as that in FIG. 11.

In the portion enclosed by the dot-and-dashed line in FIG. 1, NMOS transistors N15 and N16, threshold voltages of which are about 0V (its transistor is generally called the I-type), are provided. The drain electrode of the NMOS transistor N15 is connected to the drain electrode of the PMOS transistor P1, the source electrode of the NMOS transistor N15 is connected to the drain electrode of the NMOS transistor N16, and the source electrode of the NMOS transistor N16 is grounded. The power supply voltage VDD is applied to the gate electrode of the NMOS transistor N16, and the reference voltage VREF, which is lower than the power supply voltage VDD, is applied to the gate electrode of the NMOS transistor N15.

The drain voltage VD of the NMOS transistor N16 is given by equation (4).

$$VD = VREF - Vth \quad (4)$$

Since the NMOS transistor N16 is I type, the threshold voltage Vth is about 0V. Accordingly, the drain voltage VD is almost equal to the reference voltage VREF as seen from equation (4). In other words, the drain voltage VD of the NMOS transistor N16 always becomes the fixed value that is not affected by the power supply voltage VDD.

Since the power supply voltage VDD is applied to the gate electrode of the NMOS transistor N16, the gate voltage becomes higher than the drain voltage, thus the NMOS transistor N16 acts at the triode region. Accordingly, both of the drain current ID and the gate voltage of the NMOS transistor N16 change linearly, and a value obtained by dividing the gate voltage VDD by the drain current ID becomes equal to the impedance between the drain and source electrodes of the NMOS transistor N16.

As described above, since the NMOS transistor N16 acts in the linear region in the first embodiment, it is not necessary to provide a resistor independently. Accordingly, the change of the impedance depending on the concentration of the diffusion layer never occur. Furthermore, since the reference voltage VREF is applied to the gate electrode of the NMOS transistor N15 so that the drain voltage VD is not affected by the power supply voltage VDD, the drain voltage of the NMOS transistor N16 always become a fixed value that is not affected by the power supply voltage VDD. Accordingly, it is possible to set a delay time T for signal transmission at each one of the inverters more exactly than that of the circuit having the resistor R1 as shown in FIG. 11.

(Second embodiment)

Figure 2:
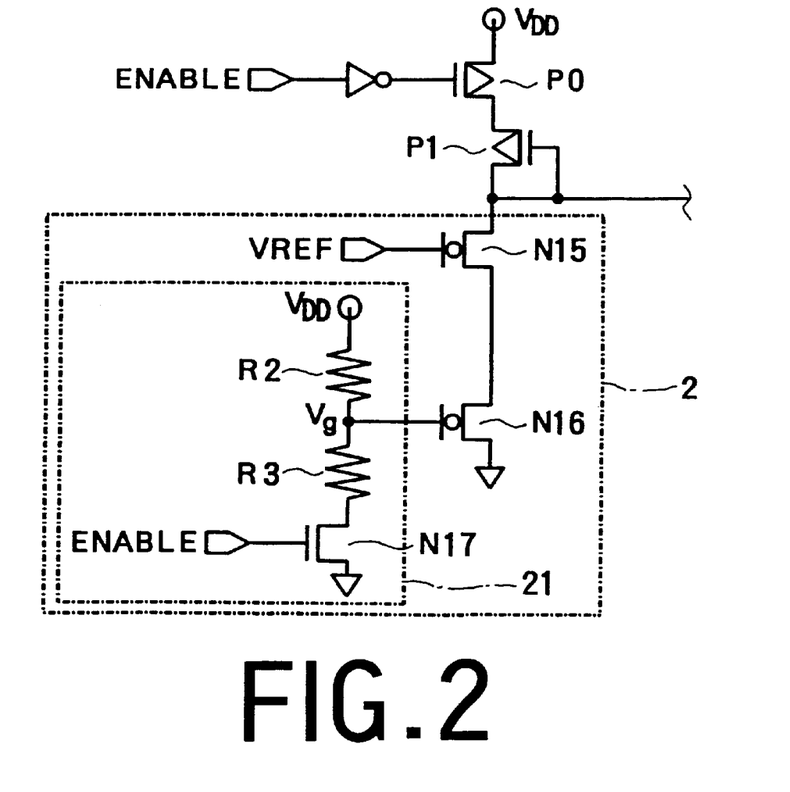
FIG. 2 is a circuit diagram showing the configuration of an oscillation circuit in a second embodiment.

FIG. 2 is a circuit diagram showing the configuration of an oscillation circuit of a second embodiment. The circuit in FIG. 2 comprises a resistance voltage divider 21 that is connected to the gate electrode of the NMOS transistor N16. The resistance voltage divider 21 comprises two resistors R2 and R3 connected in series and NMOS transistor N17 connected to a resistor R3. The power supply voltage VDD is applied to one end of the resistor R2. The source electrode of the NMOS transistor N17 is grounded, and the signal ENABLE is inputted to its gate electrode.

When the signal ENABLE takes a high level in the oscillation circuit in FIG. 2, the NMOS transistor N17 is switched ON, and one end of the resistor R3 takes a low logic level (ground level). Accordingly, a voltage Vg obtained by dividing the power supply voltage VDD by the resistor R2 and R3 is applied to the gate electrode of the NMOS transistor N16. The voltage Vg is given by equation (5), where K=R3/(R2+R3).

$$Vg = K * VDD \quad (5)$$

On the condition that the NMOS transistor N16 operates in the linear region, it is necessary to set the divided voltage Vg higher than the reference voltage. In other words, a resistance ratio of the resistor R2 to the resistor R3 is set so as to be Vg>VREF.

As described above, since the oscillation circuit of the second embodiment sets the gate voltage of the NMOS transistor N16 lower than that of the first embodiment, the impedance of the portion enclosed by the dot-and-dash line in FIG. 2 becomes larger, and as a result, it is possible to set a long delay time for signal transmission at each one of the inverters.

(Third embodiment)

As follows, a third embodiment has a feature in which it is possible to change the gate voltage of the NMOS transistor N16 by a controlled signal from outside.

Figure 3:
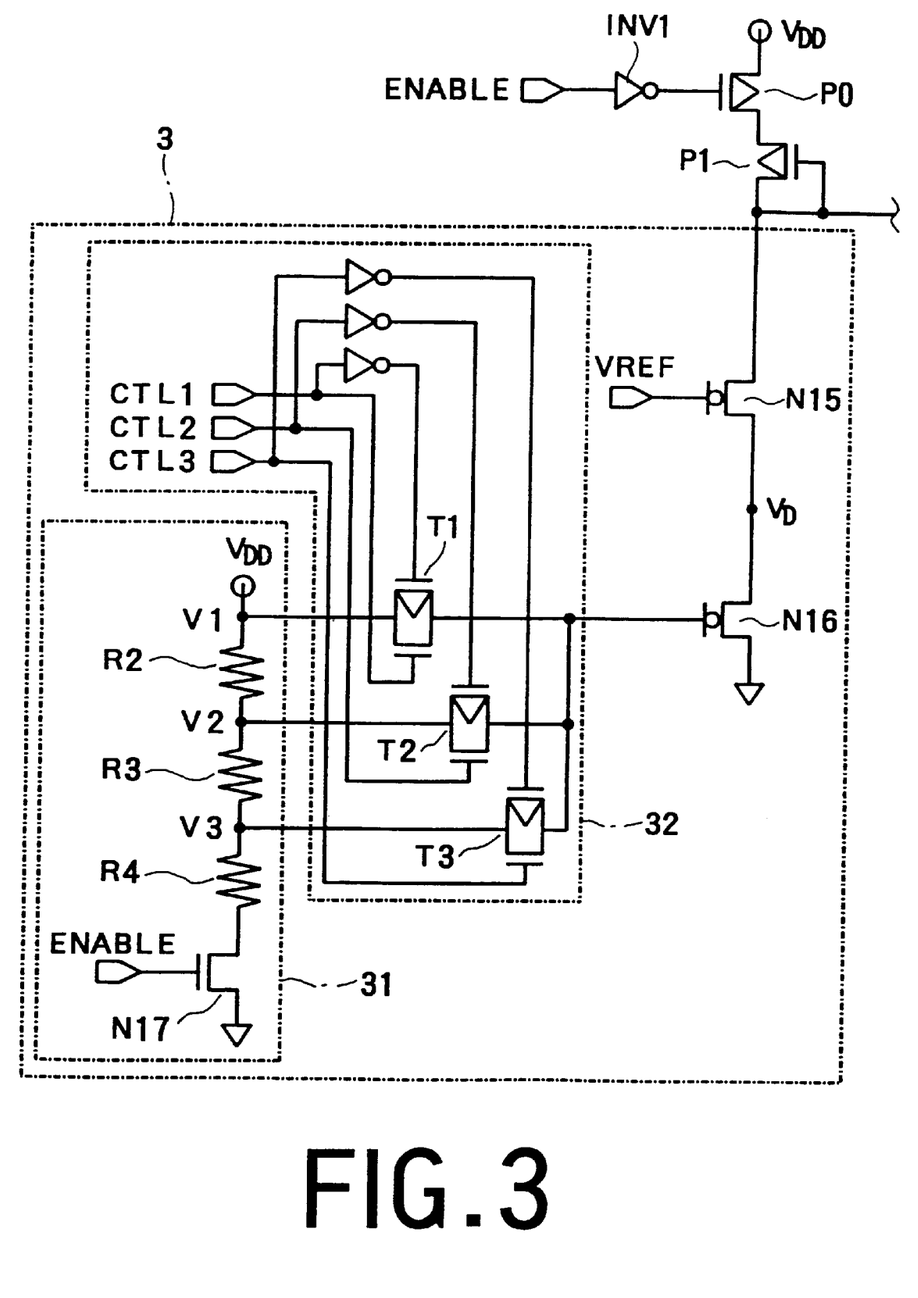
FIG. 3 is a circuit diagram showing the configuration of an oscillation circuit in a third embodiment.

FIG. 3 is a circuit diagram showing the configuration of an oscillation circuit of the third embodiment. The circuit in FIG. 3 comprises a resistance voltage divider 31 that outputs three kind of different voltages V1, V2 and V3, and a voltage selecting circuit 32 that selects any one of the voltage V1, V2 and V3. The output of the voltage selecting circuit 32 is inputted to the gate electrode of the NMOS transistor N16.

The resistance voltage divider 31 comprises three resistors R2, R3 and R4 connected in series. The voltage V1 is outputted from the connection point between the power supply voltage VDD and the resistor R2. The voltage V2 is outputted from the connection point between the resistor R2 and R3. The voltage V3 is outputted from the connection point between the resistor R3 and R4.

The voltage selecting circuit 32 comprises three transfer gates T1, T2 and T3 that are switched depending on the logic of the control signals CTL1–3 from outside, respectively. Accordingly, the gate voltage of the NMOS transistor N16 changes depending on the logic of the control signals CTL1–3.

The control signals CTL1–3 are outputted from a control circuit that is not illustrated. It may be possible to change the logic of the control signals CTL1–3 at any time. Otherwise, it may change the control signals CTL1–3 by mechanical switches, for example, dip switch, and so on. The transfer gates T1, T2 and T3 are switched by the control signals CTL1–3 so that a plurality of gates do not remain at ON-state at the same time.

As described above, since the oscillation circuit of the third embodiment changes the gate voltage of the NMOS transistor N16 by the control signals CTL1–3 from outside, it is possible to change programmably the delay time for signal transmission at each one of the inverters at any time, and as a result, it is possible to adjust the oscillation frequency automatically.

(Fourth embodiment)

A fourth-embodiment has a feature in which the oscillation circuit comprises the enhancement type of NMOS transistors (it is called E-type NMOS) instead of the I-type NMOS.

Figure 4:
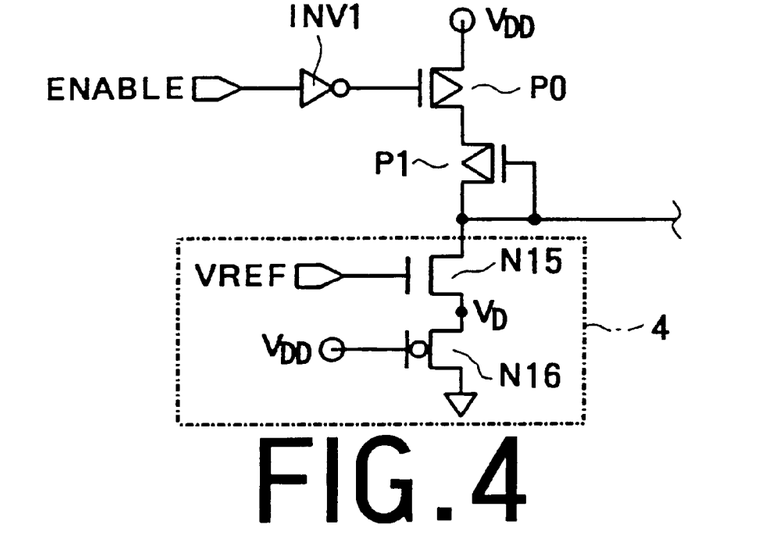
FIG. 4 is a circuit diagram showing the configuration of an oscillation circuit in a forth embodiment.

FIG. 4 is a circuit diagram showing the configuration of an oscillation circuit of the fourth embodiment. The circuit in FIG. 4 comprises an E-type NMOS transistor N15 instead of the I-type NMOS transistor N15. The other configuration of the circuit in FIG. 4 is equivalent to the circuit in FIG. 1. Consequently, transistor N15 of the FIG. 4 embodiment may be of the enhancement type having a threshold voltage larger than 0V.

In FIG. 4, the drain voltage VD of the NMOS transistor N15 is given by equation (6).

$$VD=VREF-Vth \qquad (6)$$

Since the threshold voltage of the E-type NMOS transistor N15 is a positive value larger than 0V, the drain voltage VD becomes lower than that of the first embodiment. Accordingly, even if the voltage applied to the gate electrode of the NMOS transistor N16 is low, the NMOS transistor N16 operates in the linear region. In other words, it is possible to enlarge the selective range of the power supply voltage VDD and to lower the value of the power supply voltage VDD.

(Fifth embodiment)

As follows, a fifth embodiment has a feature in which an operational amplifier OP1 controls the gate voltage of the NMOS transistor N15 in FIG. 1.

Figure 5:
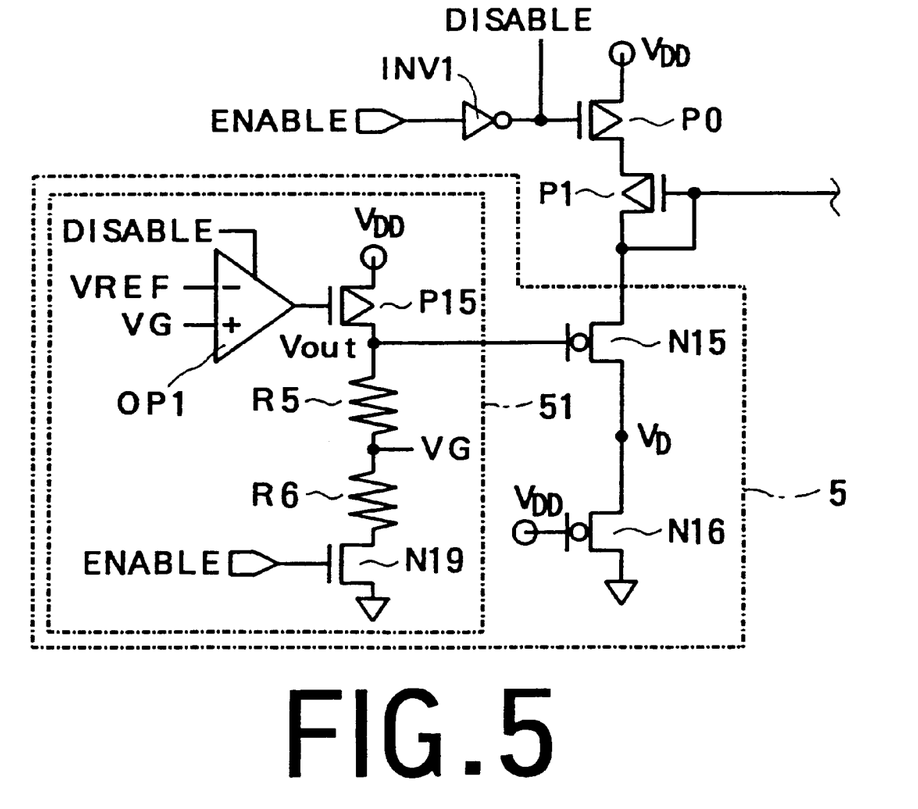
FIG. 5 is a circuit diagram showing the configuration of an oscillation circuit in a fifth embodiment.

FIG. 5 is a circuit diagram showing the configuration of an oscillation circuit of the fifth embodiment. The circuit in FIG. 5 comprises an operational amplifier OP1, a PMOS transistor P15, the gate electrode of which is connected to the output electrode of the operational amplifier OP1, and resistors R5, R6 and NMOS transistor N19 connected to the PMOS transistor P15 in series.

The power supply voltage VDD is applied to the source electrode of the PMOS transistor P15, the drain electrode of which is connected to the gate electrode of the NMOS transistor N15. A reference voltage VREF is applied to the (−) input electrode of the operational amplifier OP1, and a voltage VG at the connecting point between the resistors R5 and R6 is applied to the (+) input electrode of the operational amplifier OP1.

Figure 6:
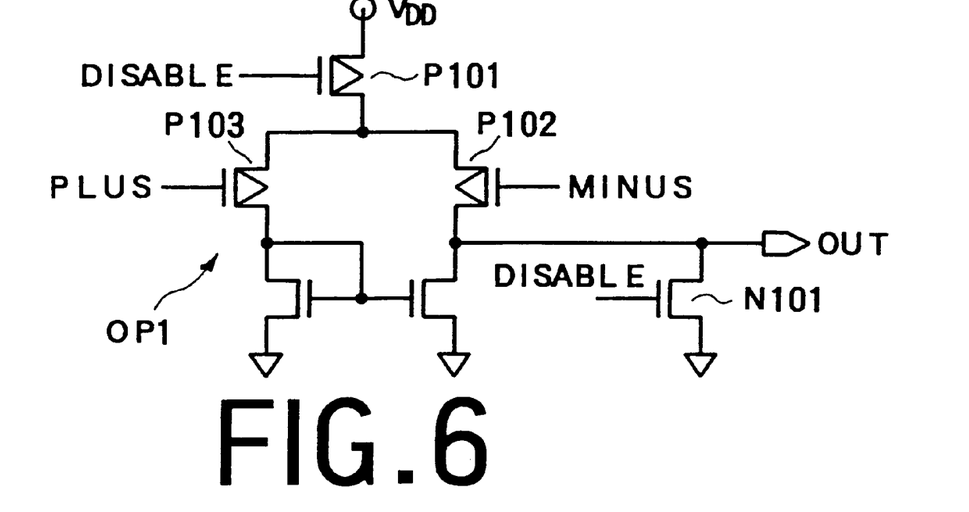
FIG. 6 is a circuit diagram showing the detailed configuration of an operational amplifier used in FIG. 5.

FIG. 6 is a circuit diagram showing the detailed configuration of the operational amplifier OP1 used in FIG. 5. The electrode PLUS in FIG. 6 corresponds to the (+) input electrode in FIG. 5, and the electrodes MINUS in FIG. 6 corresponds to the (−) input electrode in FIG. 5. When the electrode DISABLE is at a high level, the NMOS transistor N101 in the output stage is switched on, and its output is fixed at a low level. When the electrode DISABLE is at a low level and the voltage of the electrode PLUS is higher than that of the electrode MINUS, the PMOS transistor P102 is switched on, and its output becomes a high level. On the other hand, when the voltage of the electrode PLUS is lower than that of the electrode MINUS, the PMOS transistor P103 is switched on, and its output becomes low level.

Since the operational amplifier OP1 in FIG. 5 controls so that the reference voltage VREF is coincident with the divided voltage VG, the output of the operational amplifier OP1 is maintained at a fixed level. Since the gate voltage VOUT of the NMOS transistor N15 in FIG. 5 becomes lower than the power supply voltage VDD and higher than the reference voltage VREF; moreover, is not affected by the power supply voltage VDD, the drain voltage VD of the NMOS transistor N15 is also not affected by the power supply voltage VDD.

(Sixth embodiment)

As follows, a sixth embodiment has a feature in which a NMOS transistor N18 that offsets the influence of the threshold voltage of the NMOS transistor N15 is added to the oscillation circuit of the fifth embodiment.

Figure 7:
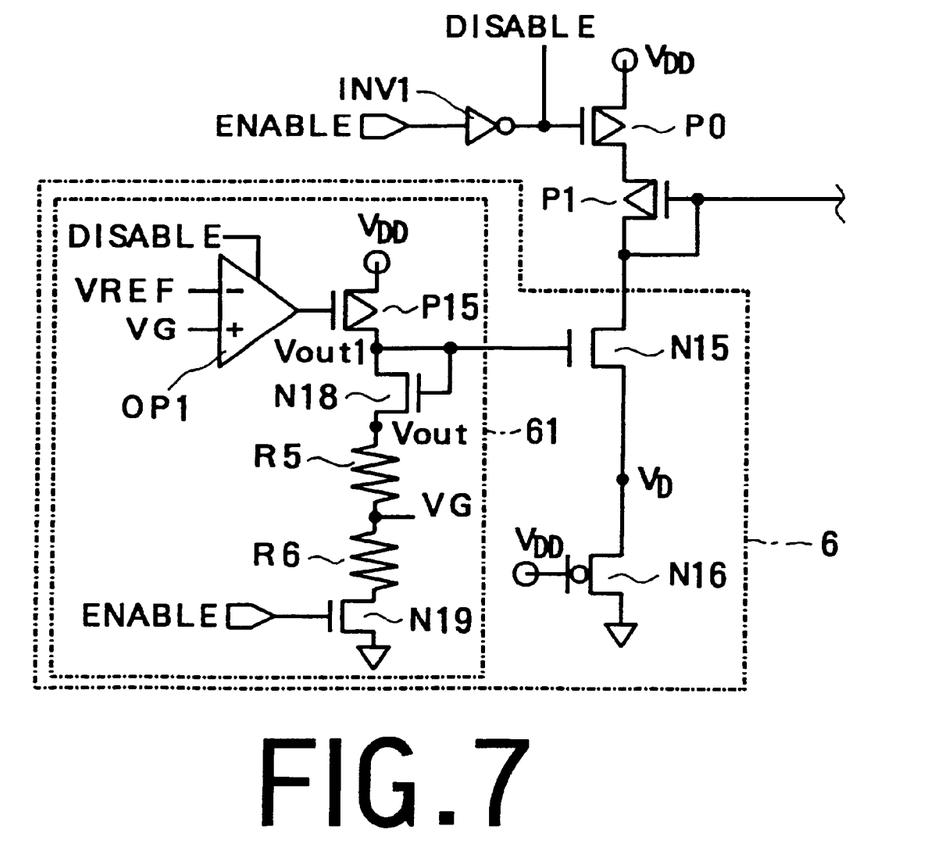
FIG. 7 is a circuit diagram showing the configuration of an oscillation circuit in a sixth embodiment.

FIG. 7 is a circuit diagram showing the configuration of the oscillation circuit of the sixth embodiment. The circuit in FIG. 7 comprises a NMOS transistor N18, which is connected between the drain electrode of the PMOS transistor P15 and the resistor R5, and the threshold voltage of which is almost equal to that of the NMOS transistor N15.

When the voltage between the source electrode of the NMOS transistor N18 and the resistor R5 is Vout and the gate voltage of the NMOS transistor N15 is Vout1, equation (7) is given by.

$$Vout1=Vout+Vth \qquad (7)$$

The drain voltage. VD of the NMOS transistor N16 is given by equation (8).

$$VD=Vout1-Vth=(Vout+Vth)-Vth=Vout \qquad (8)$$

Since the drain voltage VD is not affected by the threshold voltage Vth as seen from equation (8), it is not necessary to consider the dispersions due to the semiconductor production process, that is, the temperature property and so on.

The threshold voltages of both the NMOS transistor N15 and N18, which are selectable from among the I-type and E-type, have to be equal to each other.

(Seventh embodiment)

A seventh embodiment is a transformed example of the fifth embodiment, and sets the voltage applied to the gate electrode of the NMOS transistors lower than the reference voltage VREF.

Figure 8:
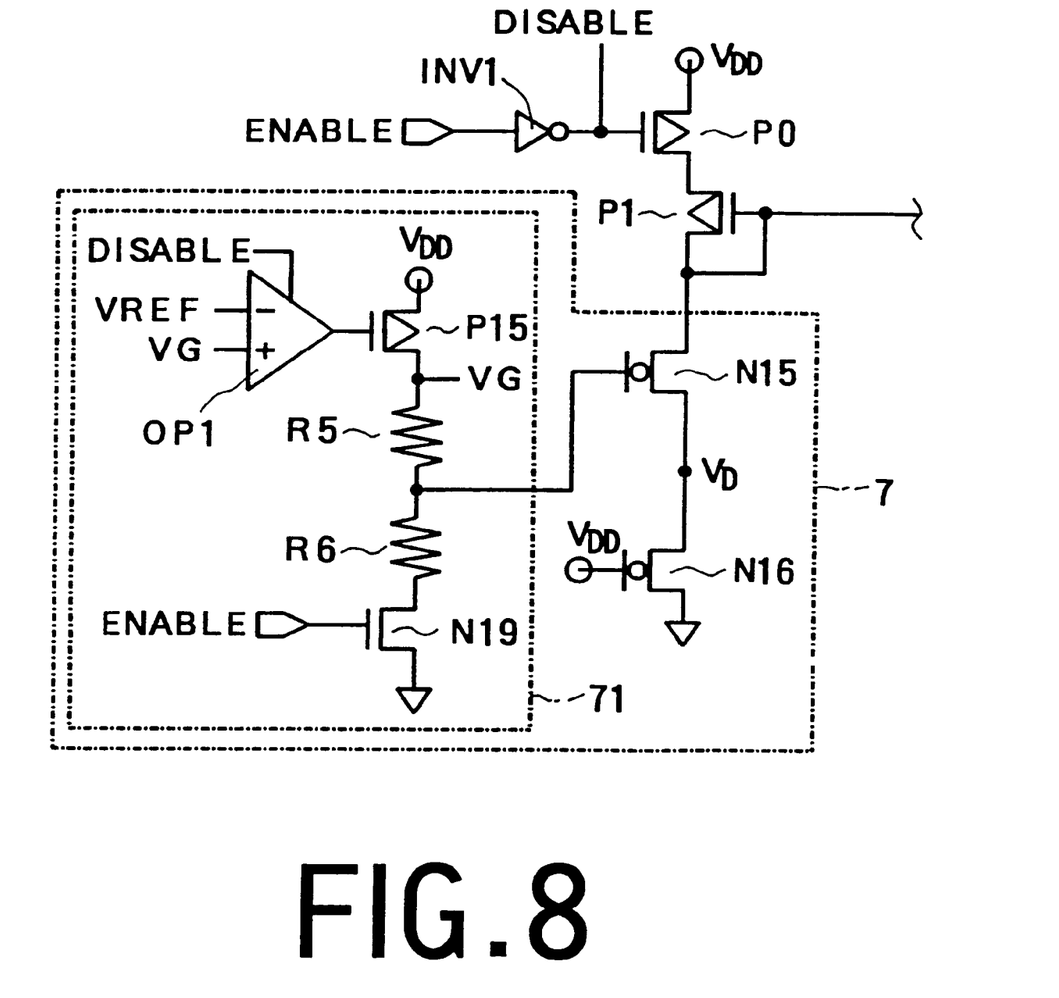
FIG. 8 is a circuit diagram showing the configuration of an oscillation circuit in a seventh embodiment.

FIG. 8 is a circuit diagram showing the configuration of an oscillation circuit of the seventh embodiment. The source voltage VG of the PMOS transistor P15 is applied to the (+) input electrode of the operational amplifier OP1, and the voltage of the connecting point between the resistor R5 and R6 is applied to the gate electrode of the NMOS transistor N15. Since the gate voltage of the NMOS transistor N15 in FIG. 8 is lower than that in FIG. 5, the drain voltage of the NMOS transistor N16 in FIG. 8 becomes lower than that in FIG. 5, and as a result, it becomes possible to set the power supply voltage VDD applied to the gate electrode of the NMOS transistor N16 in FIG. 8 lower than that in FIG. 5. In other words, it becomes possible to enlarge the selectable range of the power supply voltage VDD and to drive at the lower voltage.

(Eighth embodiment)

An eighth embodiment is a transformed example of the seventh embodiment, and has a feature that it is possible to change the voltage applied to the gate electrode of the NMOS transistor N15 by the control signal from outside.

Figure 9:
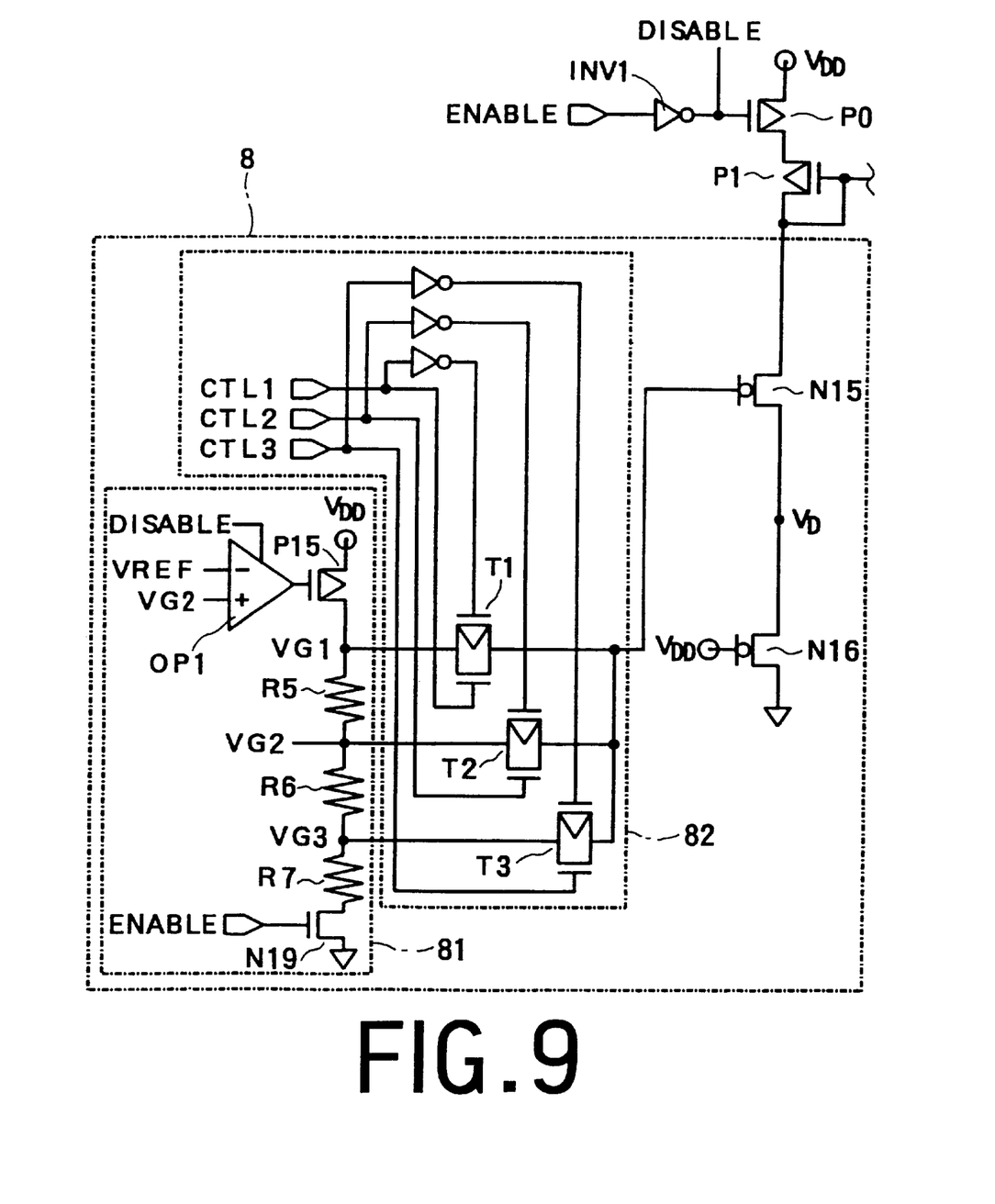
FIG. 9 is a circuit diagram showing the configuration of an oscillation circuit in a eighth embodiment.

FIG. 9 is a circuit diagram showing the configuration of an oscillation circuit of the eighth embodiment. The circuit in FIG. 9 comprises a resistance voltage divider 81 that outputs three types of different voltages VG1, VG2 and VG3, and a voltage selecting circuit 82 that selects any among the voltages VG1, VG2 and VG3. The output of the voltage selecting circuit 82 is applied to the gate electrode of the NMOS transistor N15.

Since the circuit in FIG. 9 can adjust the gate electrode of the NMOS transistor N15 programmably, it is possible to automatically change the delay time for signal transmission at each one of the inverters in FIG. 11.

(Ninth embodiment)

The circuits from the first embodiment to the eighth embodiment have the NMOS transistors N15 and N16 instead of the resistor R1 in FIG. 11. However, it may have the same resistor R1 as the conventional circuit in FIG. 11, in which case it is desirable to adjust programmably the resistance of the resistor R1.

Figure 10:
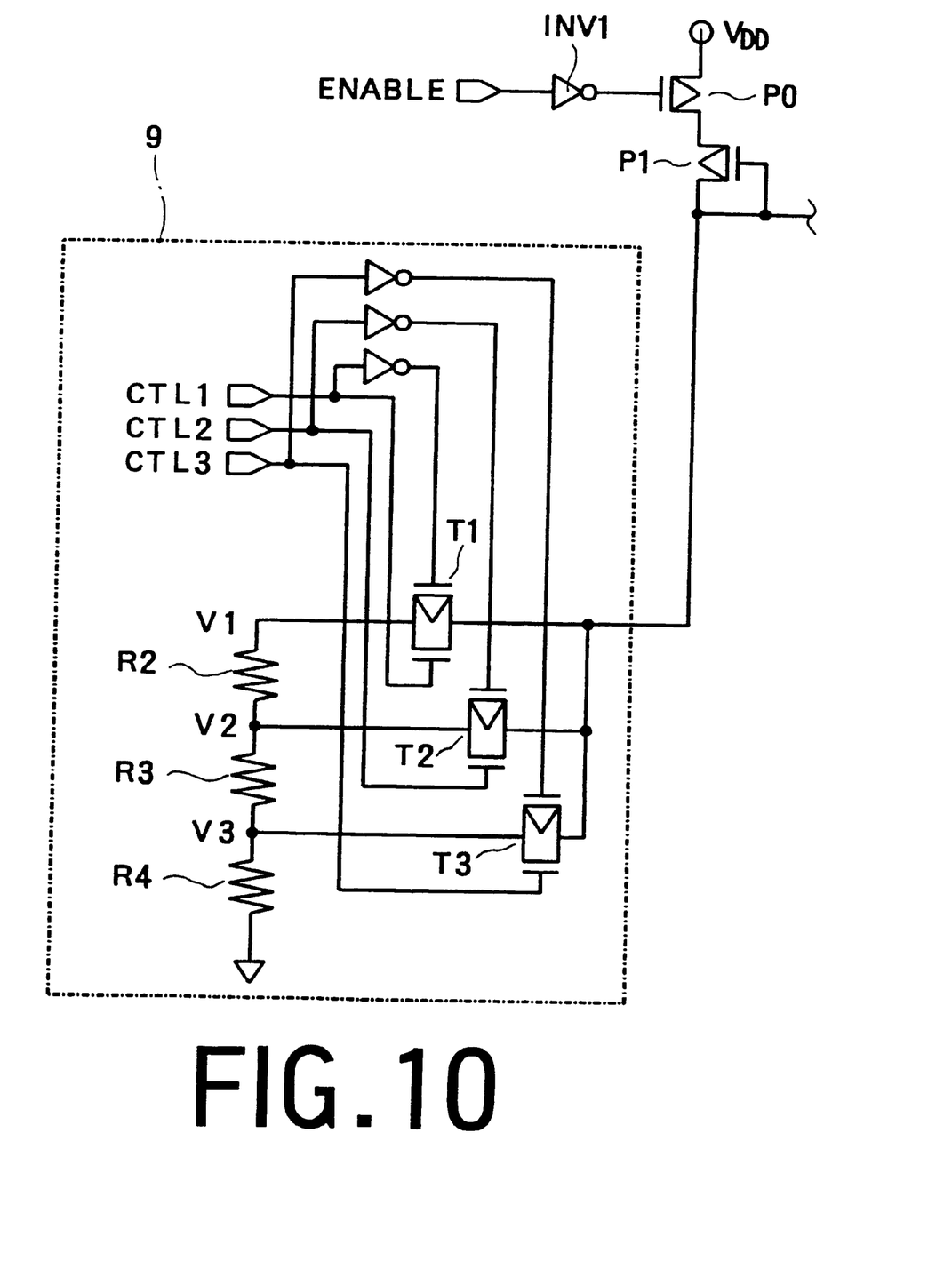
FIG. 10 is a circuit diagram showing the configuration of an oscillation circuit in a ninth embodiment.

FIG. 10 is a circuit diagram showing the configuration of an oscillation circuit of a ninth embodiment. The circuit in FIG. 10 comprises three resistors R2, R3 and R4 connected in series, and transfer gates T1, T2 and T3 connected to one end of the resistors R2, R3 and R4, respectively. These transfer gates T1, T2 and T3 are switched on/off by control signals CTL1–3 from outside. The other ends of the transfer gates T1, T2 and T3 are commonly connected to the drain electrode of the PMOS transistor P1.

Since it is possible to change the drain voltage of the PMOS transistor P1 in three ways by changing the logic of the control signals CTL1–3, even if the resistance of the resistors R1, R2 and R3 changes unintentionally, it is possible to set the most suitable resistance by changing the logic of the control signals CTL1–3.

It is possible to combine with two or more of embodiments described above. For example, it is possible to combine each from the first embodiment to the forth embodiment with each from the fifth embodiment to the eighth embodiment.

In each embodiment described above, although the examples replacing the resistor R1 of the oscillation circuit in FIG. 11 have been described, the present invention is also possible to apply to the circuits besides the oscillation circuit.

Furthermore, in each embodiment described above, although an examples using the MOS transistors have been explained, the oscillation circuit may be composed of using the bipolar transistors or the Bi-COMSs.

What is claimed is:

1. A semiconductor circuit composed of first and second transistors connected in series between first voltage electrodes with a first voltage and second voltage electrodes with a second voltage which is lower than said first voltage, wherein:

said first transistor having a gate (base) voltage set to a reference voltage that is lower than said first voltage and higher than said second voltage so that a connecting point between said first and second transistors has a voltage independent from said first voltage; and said second transistor having a gate (base) electrode to which a prescribed voltage is applied, said prescribed voltage having a voltage level causing said second transistor to operate in a linear region and causing said second transistor to act as an impedance element.

2. The semiconductor circuit of claim 1, further comprising:

a resistance voltage divider including a plurality of resistors connected in series, said resistance voltage divider outputting a plurality of voltages different from each other from connection points of said resistors, said voltages being equal to a third voltage higher than said first voltage or lower than said third voltage, and equal to said second voltage or higher than said second voltage; and a voltage selecting circuit for selecting any of the voltages outputted from said resistance voltage divider as said prescribed voltage, based on a control signal from outside.

3. The semiconductor circuit of claim 1, wherein said prescribed voltage is a third voltage higher than said first voltage.

4. The semiconductor circuit of claim 1, wherein said prescribed voltage is equal to a third voltage higher than said first voltage or lower than said third voltage, and equal to said second voltage or higher than said second voltage.

5. The semiconductor circuit of claim 1, wherein:

said first and second transistors are NMOS transistors;

said first transistor has a drain (collector) electrode connected to said first voltage electrode;

said first transistor has a source (emitter) electrode connected to the drain (collector) electrode of said second transistor; and said second transistor has a source electrode connected to said second voltage electrode.

6. The semiconductor circuit of claim 1, wherein said first transistor is of an I type having a threshold voltage of about 0V.

7. The semiconductor circuit of claim 1, wherein said first transistor is of an enhancement type having a threshold voltage larger than 0V.

8. The semiconductor circuit of claim 1, further comprising:

a plurality of inverters connected in series;

a plurality of capacitors connected to least one of positions between each output of said inverters and a power supply voltage electrode, and between each output of said inverters and a ground electrode, respectively; wherein:

said impedance element is utilized for a purpose of restricting a current flowing from the power supply electrode through the ground electrode;

an oscillation is performed at a frequency depending on a product of an impedance of said impedance element and a capacitance of said capacitor.

9. A semiconductor circuit composed of first and second transistors connected in series between first voltage electrodes with a first voltage and second voltage electrodes with a second voltage which is lower than said first voltage, comprising:

a differential amplifier for performing feedback control based on a reference voltage which is lower than said first voltage an d higher than said second voltage, so that an output voltage does not change; wherein:

said first transistor has a gate (base) electrode which is set to a voltage that is lower than said first voltage and higher than a reference voltage based on an output voltage of said differential amplifier so that first and second transistors have therebetween a connecting point of a voltage that is independent from said first voltage;

said second transistor has a gate (base) electrode to which a prescribed voltage is applied so that said second transistor operates in a linear region, in which a gate (base) voltage and a drain (collector) voltage change linearly, thus causing said second transistor to act as an impedance element.

10. The semiconductor circuit of claim 9, further comprising:

a plurality of resistors connected in series;

a resistance voltage divider for outputting a plurality of voltages different from each other from connection points of said resistors, said voltages are equal to a third voltage higher than said first voltage or lower than said third voltage, and equal to said second voltage or higher than said second voltage;

a voltage selecting circuit for selecting one of the voltages outputted from said resistance voltage divider as said prescribed voltage, based on a control signal from outside.

11. The semiconductor circuit of claim 9, wherein said prescribed voltage is a third voltage higher than said first voltage.

12. The semiconductor circuit of claim 9, wherein said prescribed voltage is equal to a third voltage higher than said first voltage or lower than said third voltage, and equal to said second voltage or higher than said second voltage.

13. The semiconductor circuit of claim 9, wherein:

said first and second transistors are NMOS transistors;

said first transistor has a drain (collector) electrode connected to said first voltage electrode;

said first transistor has a source (emitter) electrode connected to the drain electrode of said second transistor;

said second transistor has a source electrode connected to said second voltage electrode.

14. The semiconductor circuit of claim 9, wherein said first transistor is of an I type having a threshold voltage of about 0V.

15. The semiconductor circuit of claim 9, wherein said first transistor is of an enhancement type having a threshold voltage higher than 0V.

16. The semiconductor circuit of claim 9, further comprising:

a third transistor having a threshold voltage that is equal to that of said first transistor; wherein:

said third transistor is connected between an output electrode of said differential amplifier and the gate (base) electrode of said first transistor so that said first and second transistors have a connecting point of a voltage that is independent from the threshold voltage of said first transistor.

17. The semiconductor circuit of claim 16, wherein:

said third transistor is a NMOS transistor;

said third transistor has a gate (base) electrode and a drain (collector) electrode that are connected to the gate (base) electrode of said first transistor.

18. The semiconductor circuit of claim 16, further comprising:

a first resistor, one end of which is connected to said third transistor;

a second resistor, another end of which is connected to said first resistor; wherein:

said differential amplifier performs feedback control so that said first and second resistors has a connecting point at a voltage which is the same as said reference voltage.

19. The semiconductor circuit of claim 18, wherein:

said third transistor is a NMOS transistor;

said third transistor has a gate (base) electrode and a drain (collector) electrode which are connected to the gate (base) electrode of said first transistor;

a voltage depending on an output voltage of said differential amplifier is applied to the source electrode of said third transistor; and said first resistor is connected to the source electrode of said third transistor.

20. The semiconductor circuits of claim 9, comprising:

a plurality of inverters connected in series;

a plurality of capacitors connected to least one of positions between each output of said inverters and a power supply voltage electrode, and between each output of said inverters and a ground electrode, respectively; wherein:

said impedance element is utilized for a purpose of restricting a current flowing from a power supply electrode through a ground electrode;

an oscillation is performed at a frequency depending on a product of impedance of said impedance element and capacitance of said capacitor.

21. A semiconductor circuit composed of first and second transistors connected in series between first voltage electrodes with a first voltage and second voltage electrodes with a second voltage which is lower than said first voltage, comprising:

a differential amplifier for performing feedback control based on a reference voltage which is lower than said first voltage and higher than said second voltage, so that an output voltage does not change; wherein:

said first transistor has a gate (base) voltage set to a voltage that is lower than said reference voltage and higher than said second voltage so that said first and second transistors have a connecting point at a voltage that is independent from said first voltage;

said second transistor has a gate (base) electrode to which a prescribed voltage is applied so that said second transistor operates in a linear region, in which a gate (base) voltage and a drain (collector) voltage change linearly, and said second transistor acts as an impedance element.

22. The semiconductor circuit of claim 21, further comprising:

a plurality of resistors connected in series;

a resistance voltage divider for outputting a plurality of voltages different from each other from connecting points of said resistors, said voltages are equal to a third voltage higher than said first voltage or lower than said third voltage, and equal to said second voltage or higher than said second voltage;

a voltage selecting circuit for selecting one of voltages outputted from said resistance voltage divider as said prescribed voltage, based on a control signal from outside.

23. The semiconductor circuit of claim 21, further comprising:

a first resistor having one end to which a voltage depending on output voltage of said first transistor is applied;

a second resistor connected to another end of said first resistor; wherein:

a voltage of a connecting point between said first and second resistor is applied to the gate (base) electrode of said first transistor;

said differential amplifier performs feedback control so that a voltage of the connecting point between said first and second resistors is the same as said reference voltage.

24. The semiconductor circuit of claim 21, wherein said prescribed voltage is a third voltage higher than said first voltage.

25. The semiconductor circuit of claim 21, wherein said prescribed voltage is equal to a third voltage higher than said first voltage or lower than said third voltage, and equal to said second voltage or higher than said second voltage.

26. The semiconductor circuit of claim 21, wherein:

said first and second transistors are NMOS transistors;

said first transistor has a drain (collector) electrode which is connected to said first voltage electrode;

said first transistor has a source electrode connected to a drain (collector) electrode of said second transistor;

said second transistor has a source electrode connected to said second voltage electrode.

27. The semiconductor circuit of claim 21, wherein said first transistor is of an I type having a threshold voltage of about 0V.

28. The semiconductor circuit of claim 21, wherein said first transistor is of an enhancement type having a threshold voltage higher than 0V.

29. The semiconductor circuits of claim 21, comprising:

a plurality of inverters connected in series;

a plurality of capacitors connected to least one of positions between each output of said inverters and a power supply voltage electrode, and between each output of said inverters and a ground electrode, respectively; wherein:

said impedance element is utilized for a purpose of restricting a current flowing from the power supply electrode through the ground electrode;

an oscillation is performed at a frequency depending on a product of impedance of said impedance element and capacitance of said capacitor.

30. A semiconductor circuit composed of first and second transistors connected in series between first voltage electrodes with a first voltage and second voltage electrodes with a second voltage which is lower than said first voltage, comprising:

a differential amplifier for performing feedback control based on a reference voltage which is lower than said first voltage and higher than said second voltage, so that an output voltage does not change;

a plurality of resistors connected in series;

a resistance voltage divider for outputting a plurality of voltages different from each other from connecting points of said resistors, said voltages is equal to a third voltage higher than said first voltage or lower than said third voltage, and is equal to said second voltage or higher than said second voltage;

a voltage selecting circuit for selecting one of voltages outputted from said resistance voltage divider as said prescribed voltage, based on a control signal from outside; wherein:

said first transistor has a gate (base) voltage set to a voltage that is lower than said reference voltage and higher than said second voltage so that voltage of a connecting point between said first and second transistors is independent from said first voltage;

a prescribed voltage is applied to a gate (base) electrode of said second transistor so that said second transistor operates in a linear region, in which a gate (base) voltage and a drain (collector) voltage change linearly, and said second transistor acts as an impedance element.

31. The semiconductor circuit of claim 30, wherein said prescribed voltage is a third voltage higher than said first voltage.

32. The semiconductor circuit of claim 30, wherein said prescribed voltage is equal to a third voltage higher than said first voltage or lower than said third voltage, and equal to said second voltage or higher than said second voltage.

33. The semiconductor circuit of claim 30, wherein:

said first and second transistors are NMOS transistors;

said first transistor has a drain (collector) electrode connected to said first voltage electrode;

said first transistor has a source electrode connected to a drain (collector) electrode of said second transistor;

said second transistor has a source electrode connected to said second voltage electrode.

34. The semiconductor circuit of claim 30, wherein said first transistor is of an I type having a threshold voltage of about 0V.

35. The semiconductor circuit of claim 30, wherein said first transistor is of an enhancement type having a threshold voltage higher than 0V.

36. The semiconductor circuit of claim 30, wherein:

said resistance voltage divider comprises first, second and third resistors connected in series;

a voltage depending on an output voltage of said differential amplifier is applied to one end of said first resistor;

said differential amplifier performs a feedback control so that a voltage between said first and second resistors become equal to said reference voltage.

37. The semiconductor circuit of claim 30, wherein said voltage selecting circuit comprises:

a first switching circuit for switching as to whether or not the voltage of one end of said first resistor is applied to the gate electrode of said first transistor;

a second switching circuit for switching as to whether or not the voltage of the connecting point between said first and second resistors is applied to the gate (base) electrode of said first transistor;

a third switching circuit for switching as to whether or not the voltage of the connecting point between said second and third resistors is applied to the gate (base) electrode of said first transistor.

38. The semiconductor circuit of claim 30, comprising:

a plurality of inverters connected in series;

a plurality of capacitors connected to least one of positions between each output of said inverters and a power supply voltage electrode, and between each output of said inverters and a ground electrode, respectively; wherein:

said impedance element is utilized for a purpose of restricting a current flowing from a power supply electrode through the ground electrode;

an oscillation is performed at a frequency depending on a product of impedance of said impedance element and capacitance of said capacitor.

* * * * *